250-203.R 56

Examiner

Dec. 5, 1967 T. R. WHITNEY 3,356,849

DETECTOR OF CODED SIGNALS USING PHASE-LOCK TECHNIQUES

Filed Aug. 21, 1964 4 Sheets-Sheet 1

INVENTOR.
THEODORE R. WHITNEY

BY [signature]

ATTORNEYS

DETECTOR OF CODED SIGNALS USING PHASE-LOCK TECHNIQUES

Filed Aug. 21, 1964 4 Sheets-Sheet 2

INVENTOR.
THEODORE R. WHITNEY
BY Flehr and Swain (signature)
ATTORNEYS

INVENTOR
THEODORE R. WHITNEY
BY [signature]
ATTORNEYS

DETECTOR OF CODED SIGNALS USING PHASE-LOCK TECHNIQUES

Filed Aug. 21, 1964 4 Sheets-Sheet 4

INVENTOR.
THEODORE R. WHITNEY
BY
ATTORNEYS 3,356,849
Patented Dec. 5, 1967

3,356,849

DETECTOR OF CODED SIGNALS USING PHASE-LOCK TECHNIQUES

Theodore R. Whitney, 5500 Fedwood Ave., Woodland Hills, Calif. 91364

Filed Aug. 21, 1964, Ser. No. 391,150
21 Claims. (Cl. 250—203)

ABSTRACT OF THE DISCLOSURE

The phase-lock detector in accordance with this invention takes advantage of known phase limits of an incoming information signal to restrict the phase of the feedback signal generated to control the frequency of the local oscillator in the phase-lock loop, thereby increasing noise rejection and signal capture probability and helping to maintain a phase-lock condition. In the operation of a phase-lock detector, the phase of an incoming information signal is compared with that of the signal generated by a variable frequency local oscillator to provide a feedback error signal, which is used to adjust the frequency of the local oscillator to correspond with that of the incoming information signal. In cases where the phase of the incoming information signal is known to be confined within certain predetermined limits, this knowledge can be and is used in this invention to restrict the phase of the feedback error signal within comparable limits and thus minimize variations in the instantaneous frequency and phase of the feedback error signal that might result from random noise mixed with the incoming information signal. In the preferred embodiment this is accomplished by generating phase reference signals corresponding to the known variations of the phase limits in the signal to be detected and consequently in the feedback signal that could result from the demodulation of the incoming information signal, and the phase of the control signal applied to the voltage controlled oscillator is restricted within these established limits. Furthermore if the frequency deviation of the incoming signal which is to be detected is known within preestablished limits, then this a prior knowledge can also be and is used in this invention to generate an amplitude gate in the feedback loop within which the feedback signal to the voltage control local oscillator must lie in order to possess the best probability of achieving capture.

This invention relates to devices for detecting coded signals in the presence of noise by use of phase-lock techniques, and more particularly to phase-lock detectors having improved signal tracking and capture capability in the presence of wideband noise.

Phase-lock detection techniques are useful as highly efficient tools for the recovery of phase coherent information signals in the presence of wideband noise. In order to realize the greatest efficiency in the detection of any given signal, all known signal characteristics should be used in its recognition. Detection circuits using phase-lock techniques permit use of previously acquired knowledge of the frequency and bandwidth of the incoming signal to improve the detection capabilities in the presence of high level wideband noise. By this means information can be extracted from the signal in a very narrow bandwidth limited only by the spectral bandwidth of the essential information to give extreme noise rejection.

Whereas the theoretical potentials of various phase-lock techniques have long been known, there have previously been few practical applications. Generally, a phase-lock system may be described as an electronic servomechanism for acquiring and tracking coded signals which exhibit phase coherence, that is, predictable frequency and phase characteristics representative of transmitted information. It is obvious that a requirement of phase coherency severely limits the information capacity of a signal. For this reason other techniques are preferred except in a few special situations, such as in velocity measuring systems which involve transmission of a phase coherent continuous wave carrier to or from a moving target. In such systems, for example, target velocity information is contained in the form of frequency or phase changes of the incoming signal with respect to the original carrier due to Doppler effects.

Briefly, phase-lock loops previously developed for use with FM or CW signals employ a voltage controlled oscillator (VCO) for generating a local estimate of the incoming signal frequency. The phase of the local estimate is compared with that of the incoming signal to generate a direct current feedback voltage proportional to the phase difference. This phase error feedback signal is then applied as a control signal through a narrow bandpass filter to vary the frequency of the voltage controlled oscillator. Once phase-lock has been achieved, the VCO frequency automatically tracks the incoming signal and is then able to achieve full noise quieting even at low signal-to-noise ratios approaching unity. But the phase-lock condition can occur only when the local estimate from the VCO is sufficiently close to the phase and frequency of the incoming signal to permit lock-on. In other words, unless the VCO estimate is almost identical to the incoming signal, the phase error feedback signal can not be of the proper sense for correcting the VCO frequency. Since in most cases little information is available about the phase of the information signal used in modulating the incoming signal, it has been customary to introduce a linearly varying ramp voltage into the feedback path to drive the voltage controlled oscillator successively through all points within the expected modulation bandwidth to provide an opportunity for phase-lock to occur.

Similar phase-lock techniques have been used in certain advanced electro-optical tracking systems to improve the accuracy and target capture threshold in the presence of noise. Generally, these electro-optical trackers produce a code modulated target signal indicative of the target location in a field of view. For example, by focusing two images of the external field of view containing the target on a rotating reticle so that the images are displaced from the center of rotation at 90° to each other, the target location may be fixed in separate rectangular coordinates. The reticle has a pattern of alternating opaque and transparent radial spokes, the widths of which vary in coded fashion in one complete cycle around the reticle.

The rotating reticle chops the images to modulate the light reaching separate photosensitive detectors located behind the reticle. Each of the photosensitive detectors responds to produce a modulated output waveform in accordance with the coded pattern on the reticle. For example, the width of the spokes may be sinusoidally varied from wide to narrow to wide again so that the photocell produces a frequency modulated output, having a carrier frequency equal to the number of opaque or transparent spokes multiplied by the angular speed of rotation of the reticle and having a frequency deviation proportional to the maximum variation in the width of the spokes. When a target lies within the field of view, each detector output contains a sinusoidal target signal corresponding to the frequency modulation produced by the reticle. The phase of this target signal depends upon the angular position of the target image on the reticle. The target signal may then be compared in phase with a sinusoidal phase reference signal derived from the reticle to represent a hypothetical target at the fixed angular position on the reticle, such as along the line extending radially from the reticle center through the center of the field of view image. This comparison yields an indication of the angular displacement of the target image from the radial reference line thus fixing the target position along a coordinate tangential to reference line.

In some instances conventional FM detection circuitry can be used in these electro-optical trackers to detect such target signals, but only when the signal-to-noise ratio is at a comparatively high level of three or more. In most practiced circumstances, however, the target signal is mixed with wideband photon noise at a high level above that which permits full noise quieting by conventional FM receiver circuits. On the other hand, phase-lock discriminators using conventional phase-lock techniques can provide full noise quieting with threshold signal-to-noise ratios just above unity. But in certain situations, such as in tracking a star against a daylight sky, the signal-to-noise ratio in the incoming signal may fall well below unity thus exceeding even the threshold of available phase-lock circuits.

Similar detection problems are encountered in other fields of information retrieval wherein coded information contained in an incoming signal may be obscured by wideband noise levels sufficient to lower the signal-to-noise ratio below one. For example, such low signal-to-noise ratios may result when low power transmitters are used to send digital coded information over great distances from space craft and the like.

Therefore, it is an object of the present invention to provide an improved phase-lock system for detecting phase coherent coded signals in the presence of wideband noise.

Another object of the present invention is to provide an improved phase-lock discriminator for detecting frequency modulated signals in the presence of high wideband noise levels.

A further object of the present invention is to provide an extremely narrow band phase-lock discriminator having extreme noise rejection to decrease the signal-to-noise threshold and to extend capture capability over the entire signal cycle.

Yet another object of the present invention is to provide an improved target detection system for use in an electro-optical tracker.

A further object of the present invention is to provide a phase-lock loop for making use of known phase and frequency information about the incoming signal in order to narrow the bandwidth of the loop thus improving the signal-to-noise threshold while also extending the capture probability throughout the entire signal cycle.

These and other objects are achieved in accordance with the invention by the provision of a phase-lock loop that can take advantage of prior knowledge, not only of the carrier frequency or bandwidth of the incoming signals, but also of the limits between which the phase of the information signal will be restricted. By this means, the loop achieves extreme noise rejection and an increase in the signal capture probability, and extends the time to loss of lock at extremely low signal-to-noise ratios.

In prior phase-lock systems the signal feedback used to control the frequency of the voltage controlled oscillator was permitted a full 360° of phase freedom. This invention, however, permits the feedback signal to be restricted in phase between the predetermined limits within which the incoming information signal is known to occur. Noise disturbances occurring outside of the limited phase range, irrespective of their amplitude, are prevented from affecting the system operation. By proper use of the phase information in accordance with this invention, the threshold signal-to-noise ratio of a phase-lock loop can be significantly reduced and the lock-on probability correspondingly increased. Furthermore, this phase information can also be used to place narrow amplitude limits on the loop operation to improve even further the threshold and lock-on probability and in addition should phase-lock be lost due to a noise disturbance, the resulting excursion of the voltage controlled oscillator is likewise limited so that the signal may be quickly recaptured.

In accordance with one particular aspect of this invention, these principles may be employed to provide an improved phase-lock discriminator capable of tracking a frequency modulated signal where the phase of the modulating signal is known to occur within certain narrow limits. Such a phase-lock discriminator has particular application to electro-optical trackers expected to track a target at high photon noise levels, as would be encountered in tracking a star against a daylight sky. As previously mentioned, certain electro-optical trackers commonly employ a rotating reticle with alternating transparent and opaque spokes which vary in width according to a predetermined code and chop the target image to produce a coded output from a photocell. In one such arrangement, the spoke width is varied sinusoidally so that a sinusoidally frequency modulated signal having a phase dependent on the angular position of the target image on the rotating reticle is produced. When the field of view image is confined to a small angular portion offset from the center of the reticle, as in two field electro-optical trackers of the type previously described herein, the target signals have a phase confined to the angular extent of the image on the reticle. With an appropriate phase limiting arrangement in the feedback loop, the phase-lock discriminator responds only to those signals lying within the narrow phase limits determined by the angular extent of each field of view image.

In accordance with another particular aspect of this invention, the above described improved phase-lock discrimination operation may be achieved by deriving a reference signal from the reticle rotation equivalent to the target signal produced by a target located at the center of the field of view image. This reference signal is then introduced into the feedback loop as a median phase reference about which the phase limits can be established. Appropriate phase limiting circuits prevent the driving signal to the voltage controlled oscillator from exceeding the established phase limits so that the output frequency of the voltage controlled oscillator varies within limits corresponding to the possible frequency variations of the incoming signal.

Although this invention will be described herein with particular emphasis on its unique utility as an improved phase-lock frequency discriminator for electro-optical trackers, it should be understood that this invention is generally applicable to a wide variety of receiver and synchronous encoder-decoder systems in which the phase limits of the information in the incoming signal can be known beforehand. For example, in accordance with a further aspect of this invention, similar phase-lock techniques can be employed in telemetry receivers for extracting repetitious sequences of digital information from an incoming signal with predictable phase properties. The digital values need not be identical nor have predictable phase characteristics throughout the entire cycle. Nevertheless, that much of the phase characteristic which is predictable may be used to substantially improve the ability of the phase-lock operation in tracking and acquiring the incoming signal especially in the presence of high level wideband noise.

A better understanding of these and other aspects of the invention may be had by reference to the following description, taken in conjunction with the accompanying drawings, in which.

Figure 1:
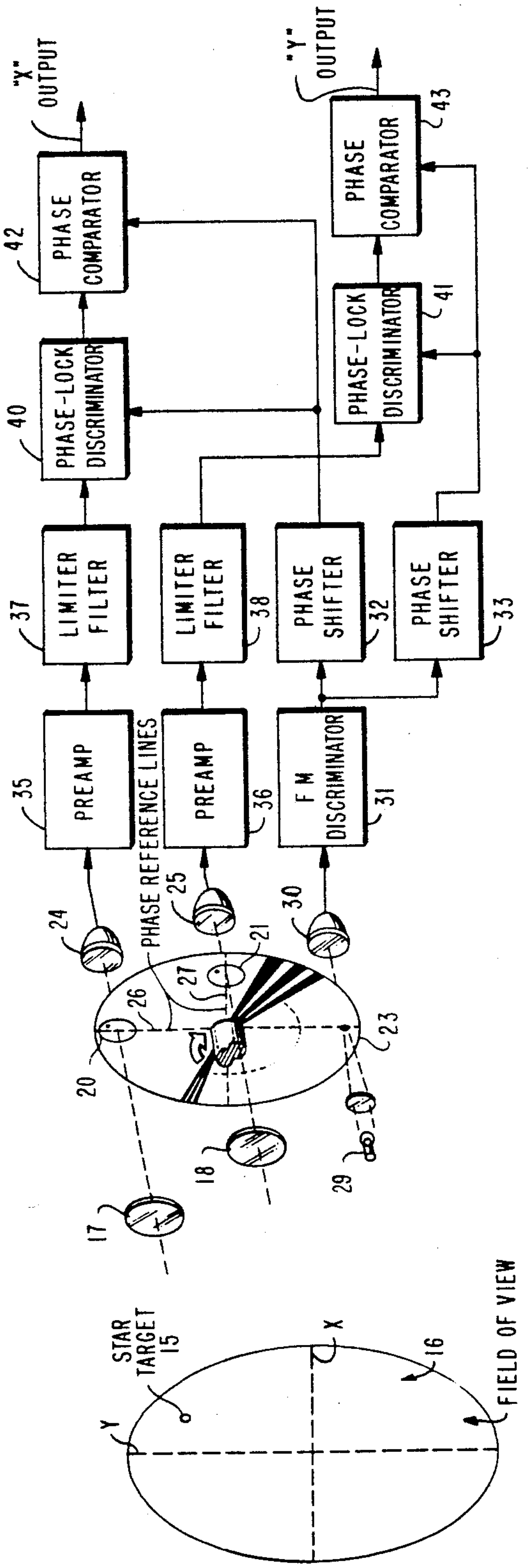
FIG. 1 is a schematic diagram illustrating a two field electro-optical tracker which includes an improved phase-lock discriminator in accordance with the invention.

Referring now to the accompanying drawings, wherein like reference characters in the different figures are used to designate similar circuit elements, the circuit elements identified may be of any suitable type. To simplify the drawings, block diagrams are employed to represent the various well-known circuit elements, the details of which will not be described herein.

The various aspects of this invention may best be appreciated by first considering the essential elements of any phase-lock loop. Generally, phase-lock loops consist of three basic elements, a voltage controlled oscillator (or other function generator) for generating a local estimate of the incoming signal, a detector for producing a feedback signal indicative of the phase of the incoming information signal, and a loop filter connected in a feedback path by means of which the output of the detector is used to control the frequency of the voltage controlled oscillator. Of course, the incoming signal should be understood to include both a phase coherent coded information signal and interfering noise that has been amplified and otherwise modified by the initial stages of a conventional receiver system. The voltage controlled oscillator is set for normal operation in the absence of an applied control signal to the center frequency of the incoming signal bandwidth. The feedback signal generated by the detector is normally an amplitude modulated voltage proportional to the measured phase difference between the VCO signal and the incoming signal. Noise contained in the incoming signal causes random amplitude variations in the feedback signal about the actual phase difference between the information signal and the local estimate generated in the voltage controlled oscillator. However, these noise variations in the phase error signal are in part filtered out of the feedback path by the loop filter before the signal is applied to the voltage controlled oscillator.

In prior phase-lock systems, the loop filter was designed with a pass-band roughly corresponding to the frequency bandwidth of the essential information in the incoming information signal. Usually a low pass filter was used having a comparatively sharp cut-off at the upper frequency limit of the information signal used to modulate the incoming signal so that noise lying above the cut-off frequency was eliminated from the control signal applied to the voltage controlled oscillator. By this means, much of the wideband noise could be prevented from affecting the operation of the phase-lock loop, but the capture probability decreased by a factor inversely proportional to the square root of the filter bandwidth.

The feedback signal controlling the frequency of the voltage controlled oscillator represents an error in phase, which constitutes the integral of the frequency difference between the incoming signal and the generated local estimate. Until phase-lock actually occurs, the output of the detector will be a beat frequency equal to the difference between the voltage controlled oscillator and the incoming signal frequencies. After phase-lock, the feedback signal changes the oscillator frequency to follow that of the incoming information signal. During tracking of the incoming signal there is no average frequency error, only a small steady state phase error, and the loop tracks the phase of the incoming information signal throughout a range of frequencies identified as the hold-in range.

The phase-lock condition can only occur when the voltage controlled oscillator output is properly related to the incoming signal. That is, the estimate generated by the oscillator must be sufficiently close both in phase and frequency so that the phase error signal fed back is of the proper sense to change the VCO frequency in the proper direction. In the previous systems, the voltage controlled oscillator would be driven to sweep through the entire bandwidth thus providing an opportunity for phase-lock to occur at one of the zero crossings of the two signals. If the sweep rate was slow, the probability of signal acquisition in any given sweep was high. But the signal should be acquired as quickly as possible, and this implies a fast sweep rate. This contradiction inherent in the prior art therefore required a compromise to insure that phase-lock could be obtained with reasonable certainty in the shortest possible interval.

However, as will later be described in more detail in connection with FIG. 3, by including an additional phase filtering action in the feedback path in accordance with this invention, the necessity for sweeping the voltage controlled oscillator through the entire frequency passband is avoided. The control signal is thus prevented from varying the frequency of the voltage controlled oscillator outside of predetermined narrow limits close enough to the known phase of the incoming signal. This permits lock-on to occur with an increased probability at the zero crossings and also, if desired, at any time through the cycle.

Referring now to FIG. 1, there is illustrated a two-field electro-optical tracker for determining the location of a target 15 within a field of view. The target 15, which may be a star serving as a navigational reference point for a moving vehicle such as a space craft, aircraft or the like, is located within a circular field of view 16. The field of view 16 is focused by appropriate optical means, herein illustrated by two lenses 17 and 18, as two separate images 20 and 21 at right angles from one another with respect to the center of a rotating reticle 23. The reticle 23 has a coded pattern of alternating opaque and transparent spokes extending radially from the reticle center of rotation. In accordance with this embodiment, the widths of the spokes vary sinusoidally from wide to narrow to wide again in one complete cycle around the circumference. Separate photocells 24 and 25 located behind the reticle opposite the field of view images 20 and 21 receive the light from the target image as it passes through the transparent radial spokes. Rotation of the reticle 23 chops the images 20 and 21 to modulate the light reaching the photocells 24 and 25 in accordance with the pattern used. Accordingly, using a reticle 23 with sinusoidally varied spoke widths, the photocells 24 and 25 generate a frequency modulated output signal having a center carrier frequency equal to the number of opaque or transparent spokes on the reticle multipled by the speed of rotation and having a fixed frequency deviation proportional to the peak-to-peak sinusoidal variation in the spoke width. The output signals resulting from a target lying within the field of view contain a sinusoidal target signal with a phase corresponding to the angular position of each target image on the reticle 23. Since in the two-field tracker two separate target images are created at approximately right angles from one another on the reticle, the two photocell traget signals modulating the frequency of the photocell outputs will also be approximately 90° apart.

The angular position of each target image is determined by comparing the phase of each target signal with a phase reference signal derived from a point at a fixed angular position on the reticle. Preferably the target position should be measured relative to the center of the field of view so that the measured position of the target 15 can be used directly for corrections needed for centering the target in the field of view. Accordingly, a separate reference signal is generated for each field of view image corresponding to a hypothetical target located on the radial reference line extending from the reticle center through the center of the respective field of view image 20 or 21.

The hypothetical phase reference lines lie at right angles to one another with respect to the orientation of the field of view 16 in the two images 20 and 21 and therefore correspond to rectangular coordinate X and Y axes by which target position may be determined. These X and Y reference signals are derived from the reticle 23 by focusing a point of light from an internal source 29 at a selected angular position on the reticle 23. A photocell 30 disposed behind the reticle receives the chopped light to produce a sinusoidally frequency modulated reference signal substantially free of noise. A conventional FM discriminator 31 demodulates this FM signal producing a sinusoidally varying voltage with a constant phase representative of the selected angular position. The sinusoid is then phase shifted by different fixed amounts by phase shift circuits 32 and 33 to represent the angular positions of the two phase reference lines 26 and 27.

The signals from the photocells 24 and 25 which contain interfering wideband photon noise are applied through respective preamplifier circuits 35 and 36 and limiter and filter circuits 37 and 38 wherein the incoming signal is modified in conventional FM fashion for the succeeding detection circuitry. Commonly, the preamplifiers 35 and 36 are broadband high gain amplifiers with low output impedance, whereas the limiter and filter circuits 37 and 38 contain additional bandpass amplifier stages for further amplifying signals within the bandwidth of incoming signals produced by an actual traget. Phase-lock discriminator circuits 40 and 41 then track the frequency variations of the respective incoming photocell signal to yield a substantially sinusoidal target signal output, the phase of which corresponds to the angular position of the monitored target image. The phase of each of these sinusoidal target signals may then be compared with the appropriate phase references in associated phase comparator circuit 42 or 43 to provide X and Y outputs proportional to the angular displacement of the target image from each of the respective phase reference lines. This permits the exact target location to be fixed in two coordinates and, if desired, the X and Y outputs may be used directly to bring the center of the field of view onto the target 15.

The FM photocell output signals of such electro-optical trackers obviously are phase coherent and thus lend themselves to detection by phase-lock techniques. Furthermore, with the two-field tracker illustrated, the field of view images 20 and 21 are each confined to small angular portions of the entire reticle circumference. Accordingly, the target signals must exist within certain narrow phase limits corresponding to the angular extent of the field of view images 20 and 21. If the signal-to-noise ratio of the incoming signal is below unity, then conventional phase-lock principles are not effective, and the additional information as to the phase limits of the target signal must be used in accordance with this invention to significantly increase the noise rejection capability and the lock-on speed and probability. Otherwise the target signal cannot be distinguished from the high level wideband photon noise.

Figure 2:
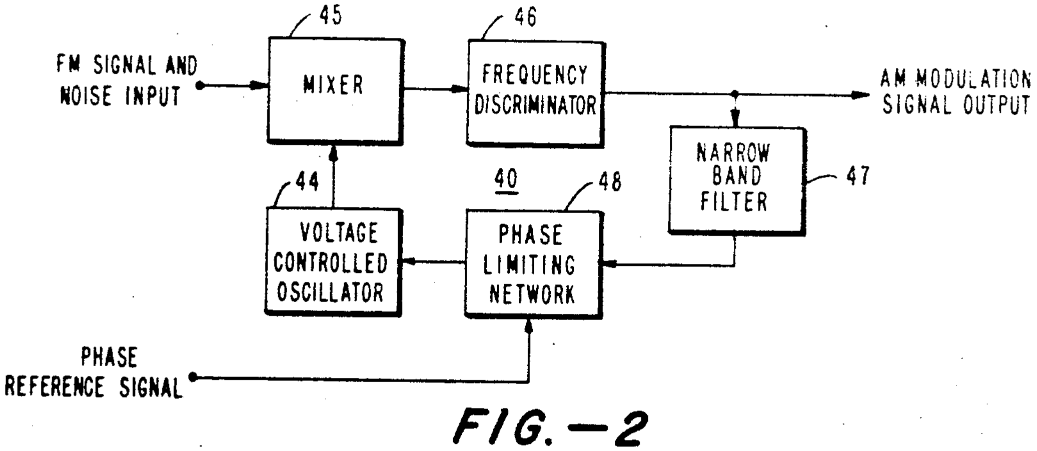
FIG. 2 is a circuit diagram in block diagram form illustrating the essential elements of an improved phase-lock discriminator in accordance with the invention which may be used in the two field electro-optical tracker shown in FIG. 1.

Referring now to FIG. 2 there is illustrated the circuitry of an improved phase-lock discriminator 40 which permits the electro-optical tracker shown in the FIG. 2 to track optical tragets at extremely low signal-to-noise ratios. The incoming FM signal contains the frequency modulating target signal along with wideband noise not removed by preliminary bandpass filtering. A local estimate of the incoming signal frequency generated by a voltage controlled oscillator 44 which constitutes a controlled variable frequency generator is mixed with the incoming signal in a mixer circuit 45. The combined signal from the mixer 45 is then applied to a frequency discriminator 46 or other suitable frequency selective network by which the applied modulated signal may be converted to an amplitude modulated signal indicative of the instantaneous frequency deviation from the center frequency $f_c$ of the modulation bandwith. Without the noise, this signal would have a sinusoidal waveform of constant frequency with a phase indicative of the angular location of the target image on the reticle 23. A feedback path including a narrow band frequency filter 47 and a phase limiting network 48 connected in series with the output of the frequency discriminator 46 delivers a control signal voltage to vary the frequency output of the voltage controlled oscillator 44. The narrow band filter 47 may be a resonant circuit tuned to the frequency of the modulating signal, that is, to the frequency of rotation of the reticle 23, with a relatively high Q to give a very narrow passband. The passband of the filter 47 need only be sufficient to accommodate frequency shifts due to movements of the target in the field of view or minute variations in the rotation speed of the reticle 23.

With this invention additional noise is eliminated from the feedback loop in substantial quantities by the inclusion of a phase limiting network 48 without further restricting the passband of the filter 47. In the prior phase-lock systems the control signal applied to the voltage controlled oscillator 46 contained all noise components having frequencies within the bandpass limits of the loop filter. Any unfiltered noise in the control signal lowered the probability of achieving phase-lock and could cause loss of phase-lock if of sufficient amplitude. Previously, additional noise could not be eliminated simply by further narrowing the passband of the filter because this decreases signal capture capability. However, with the phase limiting network 48, the operation of which is described hereinafter in greater detail, even those noise disturbances able to pass the narrow band frequency filter 47 have little effect upon the operation of voltage controlled oscillator 44, regardless of their amplitude, unless the phase of these noise disturbances lies within the narrow phase limits established. This dual phase and frequency filtering action in the feedback path of the phase-lock discriminator 40 obviously greatly improves phase-lock operation in the present of high level noise in the incoming signal. It should be understood at this point that the series order of the filter 47 and the phase limiting network 48 in the feedback path may be reversed, if desired, depending upon the type of phase limiting network 48 used without substantially changing the basic operation.

While any appropriate form of phase limiting network may be employed, certain preferred forms are illustrated herein as exemplary to explain the nature of the invention. The waveform diagram of FIG. 3 illustrates a simple phase limiting operation such as may be achieved with the phase limiting circuit of the type shown in FIG. 4. Using this method of phase limiting, significant portions of the total wideband noise may be eliminated from the loop to decrease the signal-to-noise threshold ratio necessary for full noise quieting, to significantly increase the lock-on probability at the zero crossings, and to increase the time interval before loss of lock occurs.

Figure 3:
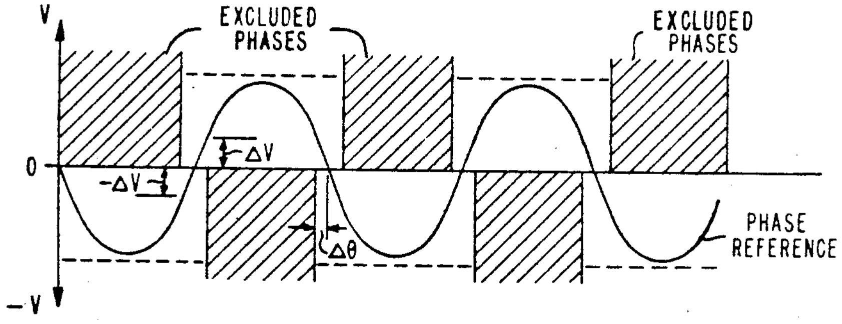
FIG. 3 is a waveform diagram illustrating the operation of one preferred form of phase limiting circuit, such as that illustrated in FIG. 4.

As shown by the waveform diagram of FIG. 3, a simple gating circuit can be used for preventing the passage of signals of a given polarity during certain portions of the feedback signal cycle in accordance with the known phase limitation of the incoming target information signal. In other words, during the time that the target signal is known to be of one polarity, the phase limiting circuit 48 acts to block signals of the other polarity appearing in the feedback path. Obviously, with a sinusoidal target signal, the signal 48 acts to block one polarity and then the other during alternate half cycles, each polarity being blocked during an equal interval less than a half cycle's duration. During the short intervening intervals between the blocking of opposite polarities, both polarities are permitted to pass, and these short intervals are made equal to the known phase range of the target information signal.

Figure 4:
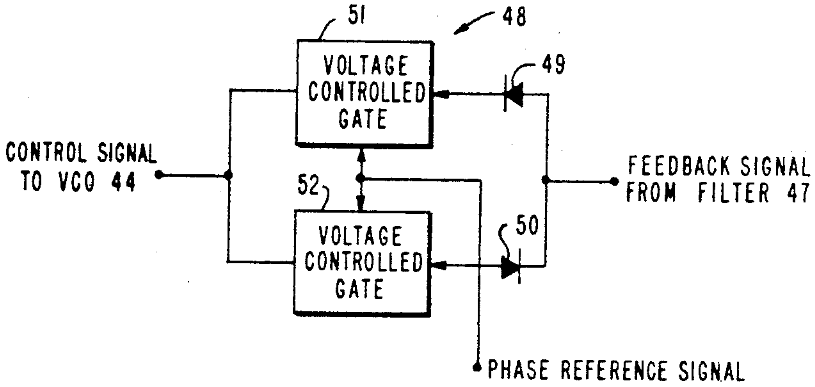
FIG. 4 illustrates partially in block diagram form a phase limiting network used in accordance with this invention for achieving the phase limiting operation illustrated in the waveform diagram of FIG. 3.

FIG. 4 illustrates a simplified gating arrangement for achieving the above-described phase limiting operation. A pair of oppositely poled diodes 49 and 50 separate the feed-back signal from the filter 47 into separate positive and negative components, which are then applied to the input of two voltage controlled gates 51 and 52. The phase reference signal is applied to control both of the gates 51 and 52 so that they open to pass signals of a given polarity applied to their input. The voltage controlled gate 51, which receives the positive polarity components, is designed to remain open whenever the phase reference signal exceeds a given negative voltage $-\Delta V$, whereas the voltage controlled gate 52, which receives the negative polarity components, is designed to remain open whenever the phase reference signal is below a given positive voltage $+\Delta V$. Thus, both gates 51 and 52 are open during the interval when the phase reference signal is between $-\Delta V$ and $+\Delta V$, and this period defines the phase range $2\Delta\theta$ of the incoming signal. The opposite polarity signal components passing the gates 51 and 52 are then recombined to be applied as a control signal to the voltage controlled oscillator 44.

During the time that the voltage controlled gate 51 or 52 is closed, all signal components of that polarity are prevented from being applied as a control signal to change the frequency of the voltage controlled oscillator 44. Also, at the zero crossings the estimated signal is in close phase proximity to the incoming FM signal, thus increasing the probability of lock-on. By this relatively simple method, the threshold signal-to-noise ratio of the loop is reduced by a factor proportional to the ratio of the limited phase range to the 360° of phase freedom permitted in prior systems and the time to loss of lock is extended. Moreover, the lock-on probability is correspondingly increased by a factor roughly proportional to the inverse square root of this phase ratio.

Further significant improvements of the loop operation can be realized by also placing amplitude restriction on the control signal in accordance with the known phase limitation. For example, a simple direct current clamping arrangement (not shown) can be used to restrict the amplitude excursions of the control signal in the permitted phases, as shown by the dashed lines in FIG. 3. The added advantages of such amplitude limiting are more fully described in connection with the preferred embodiments shown in FIGS. 5 and 7 and in conjunction with their explanatory waveform diagram of FIGS. 6 and 8.

Figures 5, 7, 9:
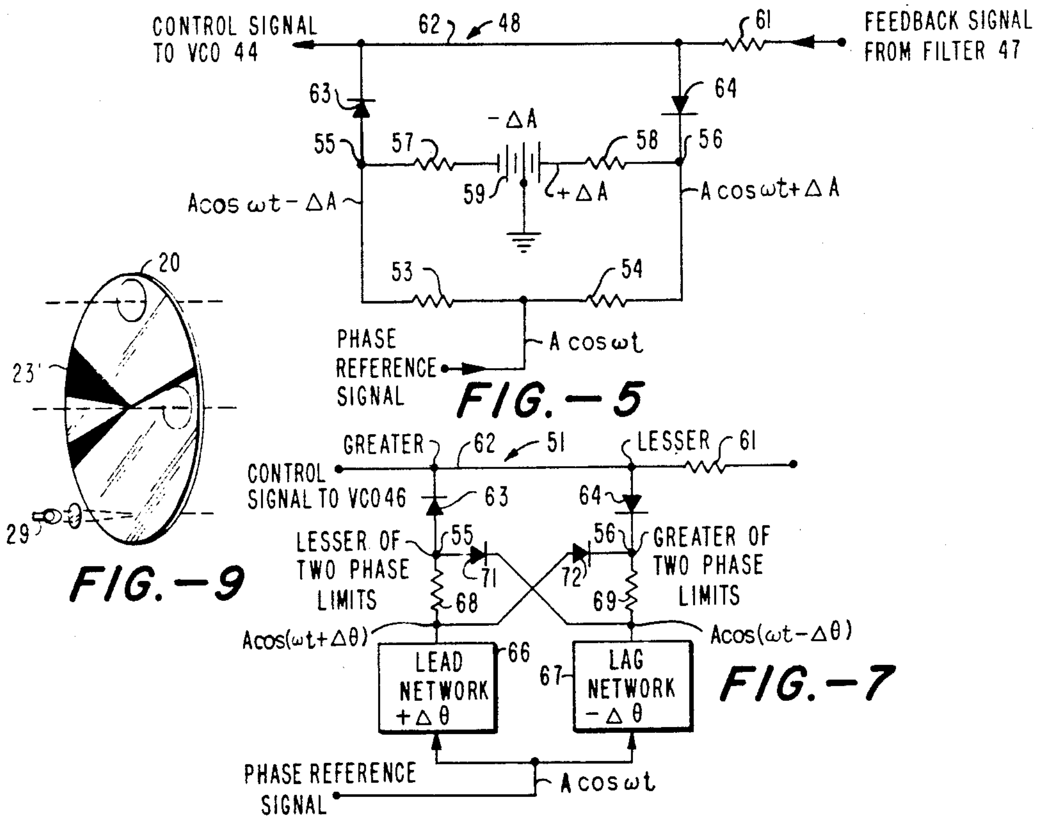
FIG. 5 is a detailed circuit diagram illustrating another preferred form of phase limiting circuit for use in the phase-lock discriminator shown in FIG. 2.
FIG. 7 is a detailed circuit diagram illustrating a further preferred form of phase limiting circuit useful in the phase-lock discriminator of FIG. 2.
FIG. 9 illustrates a non-sinusoidally coded reticle used in electro-optical trackers which may employ improved phase-lock loops in accordance with this invention.
Figure 6:
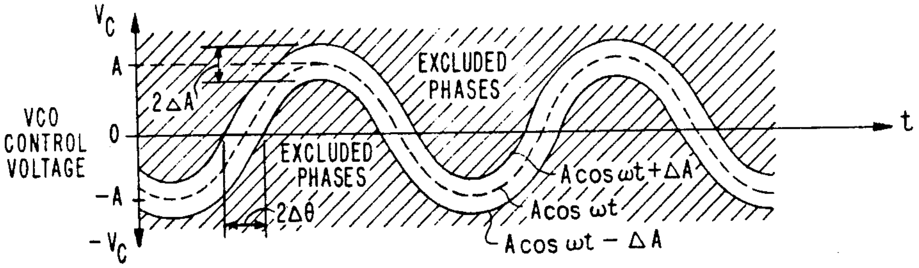
FIG. 6 is a waveform diagram illustrating the operation of the phase limiting circuit illustrated in FIG. 5.

Now, referring to the circuit of FIG. 5 and its accompanying waveform diagram in FIG. 6, there is illustrated one preferred form of phase limiting network capable of using amplitude limiting in accordance with the known phase limitations of the incoming signal to significantly improve the operation of the phase-lock discriminator illustrated in FIG. 2. The phase reference signal applied to the phase limiting network 48 will be assumed to have a sinusoidal waveform with an amplitude representative of the instantaneous frequency deviation and a phase corresponding to that of a hypothetical target located on the associated radial phase reference line through the center of the field of view image 20 or 21. For purposes of this explanation, the phase reference signal will be identified a A cos $\omega t$ and defines the midpoint between the desired phase limits, as shown in FIG. 6 This phase reference signal A cos $\omega t$ is applied through a pair of small resistors 53 and 54 to the junctions 55 and 56, which are connected through another pair of small resistors 57 and 58 to the opposite polarity terminals of a direct current voltage source 59. The voltage source 59 is coupled to a reference ground potential at its central terminal so that equal positive and negative voltage increments $+\Delta A$ and $-\Delta A$ are algebraically added to the phase reference signal A cos $\omega t$ at the terminals 55 and 56. As shown in the waveform diagrams of FIG. 6, this yields upper and lower phase limiting signals $A \cos \omega t+\Delta A$ and $A \cos \omega t+\Delta A$ at the terminals 56 and 55 respectively.

The voltage fed back through the narrow band filter 47 is connected by a small resistor 61 to a control signal lead 62 that is coupled directly to the voltage controlled oscillator 44. A first clamping diode 63 connected to conduct in the forward direction from terminal 55 to the control voltage lead 62 prevents the control signal voltage on the lead 62 from falling below the lower phase limiting signal $A \cos \omega t-\Delta A$, and a second clamping diode 64 connected to conduct in the forward direction from the control signal lead 62 to the terminal 56 prevents the control signal voltage from exceeding the upper phase limit signal $A \cos \omega t+\Delta A$. In other words, the diode 63 selects the greater of the two signals $A \cos \omega t-\Delta A$ and the feedback, whereas the diode 64 selects the lesser of the two signals $A \cos \omega t+\Delta A$ and the feedback to control the frequency of the voltage controlled oscillator 44.

The magnitude of the voltage increment $\Delta$A depends on the angular extent of the field of view images 20 and 21. Assume, for example, that each of these images 20 and 21 has a total angular extent of three degrees, one and a half degrees on either side of the respective phase reference lines 26 and 27. This means that if the target is present within the field of view, the target signal must appear within a one and a half degree phase increment $\Delta\theta$ on either side of the phase reference A cos $\omega t$. The magnitude of the voltage increment $\Delta$A is determined by simple geometry to be equal to A sin $\Delta\theta$.

Thus, the control voltage applied to the voltage controlled oscillator is confined within the phase limits defined so that all noise disturbances, no matter what their amplitude, occurring in the excluded phases, as shown by the hatched areas in the waveform diagram of FIG. 6, can have no effect on the loop operation. This improves the signal-to-noise threshold of the phase-lock loop over that obtainable with the prior system decreasing it by a factor proportional to the ratio between the total permitted phases $2\Delta\theta$ and a total cycle of 360°.

Also, it should be noted that there is a similar improvement in system operation with regard to acquiring and maintaining the phase-lock addition. Before phase-lock occurs the control voltage applied to the voltage controlled oscillator is permitted random variation between the phase limits. However, there can never be more than a maximum of $2\Delta\theta$ degrees of phase difference between the target signal and the output of the voltage controlled oscillator 44. Accordingly, pull-in can occur at any time during the entire signal cycle whenever the VCO frequency equals that of the incoming FM signal due to the target. In fact, random noise signals in the feedback path can cause the VCO frequency to be driven between the phase limits a number of times each cycle thereby increasing the number of opportunities for phase-lock to occur. Even without such random noise variations in the feedback signal, the natural inertia of the voltage controlled oscillator causes the VCO control signal to traverse between the phase limits at least twice each cycle. Also, should random noise in the feedback cause momentary loss of phase-lock, the same considerations apply so that phase-lock can be quickly regained. A noise signal, no matter what its ampitude, can never drive the VCO control signal beyond the restricted phase limits defined by the clamping action of the diodes 63 and 64.

It should however be noted that the phase limiting arrangement illustrated in FIG. 5 will permit the amplitude of the control voltage to the voltage controlled oscillator 44 to exceed the frequency deviation limits of an incoming FM signal due to a target by an amount equal to $\Delta A$. Although this result is not desirable, it has little serious effect on the system operation because the natural inertia of the voltage controlled oscillator tends to restrict its frequency output to the lower ranges at the control voltage peaks. However, it does permit undesired noise signals of the proper frequency and phase, but of different peak amplitude, to pass the feedback loop to interfere with proper tracking of the incoming signal frequency. For this reason, the system shown in FIG. 7 may be preferred since it can achieve the desired phase restriction and in addition prevent undesirable peak frequency deviations due to certain noise signals. A waveform diagram illustrating its operation is shown in FIG. 8.

In this arrangement, the phase reference signal $A \cos \omega t$ is first applied to a pair of phase shifting networks 66 and 67, one being a lead network 66 for generating a phase limit signal defined by the expression $A \cos (\omega t+\Delta\theta)$ and the other being a lag network for generating another phase limit signal identified by the expression $$A \cos (\omega t-\Delta\theta)$$

These two phase limit signals define the permitted phase range $2\Delta\theta$ extending equal distances on either side of the phase reference signal $A \cos \omega t$.

Figure 8:
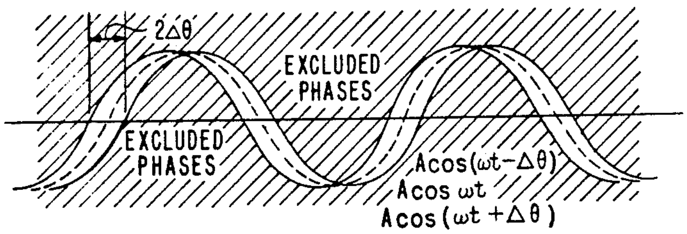
FIG. 8 is a waveform diagram illustrating the operation of the phase limiting circuit of FIG. 7.

As shown in the waveform diagram of FIG. 8, the two phase limit signals $A \cos (\omega t-\Delta\theta)$ and $A \cos (\omega t+\Delta\theta)$ intersect one another so that one has the greater amplitude than the other for one-half a cycle whereas the condition is reversed for the other half cycle. For this reason, the phase limit signals from the lead and lag networks 66 and 67 are each connected through a small resistor 68 or 69 to the associated terminal 55 or 56. These terminals 55 or 56 define the upper and lower amplitude levels, respectively, of the control signal applied to the voltage controlled oscillator 44, as previously described. A diode 71 is connected to conduct in the forward direction between the terminal 55 and the output of the phase lag network 67 so that the signal appearing at the terminal 55 is the smaller in amplitude of the two phase limit signals. Another diode 72 is similarly connected to conduct in the forward direction from the output of the phase lead network 66 to the terminal 56 so that the signal appearing at the terminal 56 is the greater in amplitude of the two phase limits. In this manner, the control voltage appearing on the control signal lead 62 is confined between the two phase limit signals by the clamping action of the diodes 63 and 64 in the manner previously described.

In the drawings the narrow band filter 47 is shown as preceding the phase limiting network 48 in the feedback path, but it should be obvious to those skilled in the art that the order of these two circuits may be reversed, if preferred without substantially changing the system operation. Note that, as shown in FIG. 8, whereas the strictly phase limiting operation of the circuit shown in FIG. 7 prevents excess frequency deviations at the phase limit peaks, the intersections between the two phase limits can prevent tracking of the target signal throughout the entire cycle. This is illustrated by the dotted phase reference line $A \cos \omega t$ which may be seen to lie outside the phase limits at its peak. While the result of this may not be serious, a momentary loss of the lock condition twice each signal cycle is certainly not desirable. Therefore, this is one instance in which the preferred position of the phase limiting network 48 is first in the series feedback path. With this arrangement the frequency filtering action of the narrow band filter 47 can then act to smooth the intersection between the two phase limits and thereby give a finite amplitude gap at the point of intersection to permit signal tracking throughout the whole cycle and prevent even momentary loss of lock. Of course, it will be obvious to those skilled in the art that the phase limits may be established in other ways such as by mechanical commutation arrangements consisting of wipers associated with conductive bands on the reticle.

It should be noted that the phase-lock discriminator shown in FIG. 3 differs in one obvious respect from the more commonly recognized phase-lock circuits. In particular no phase comparison between the signal from the voltage controlled oscillator 44 and the incoming signal is actually performed by the circuit elements. But, this discrepancy is merely one of form and not of substance because of the sinusoidal nature of the target information signal modulating the incoming FM signal. The phase error signal produced by the phase error detector used in most phase-lock circuitry represents the integral of the frequency error so that during phase-lock the frequency changes of the incoming FM signal can be tracked without a steady state frequency error, only a phse difference. However, when the frequency of the incoming FM signal is varied sinusoidally, the phase error signal produced by a phase comparison would simply yield another sinusoid lagging the incoming signal by 90°. Accordingly, a simple frequency discriminator 46 is used herein to sense the frequency deviations directly instead of by phase comparison. However, it should be understood that the more conventional phase comparator operation may be employed if desired for sinusoidally modulated signals, and must be employed, as hereinafter described particularly in connection with FIGS. 10 and 11, if phase-lock techniques are to be applied in the detection of non-sinusoidally coded signals such as those resulting from a randomly coded reticle 23', as shown in FIG. 9.

Figure 10:
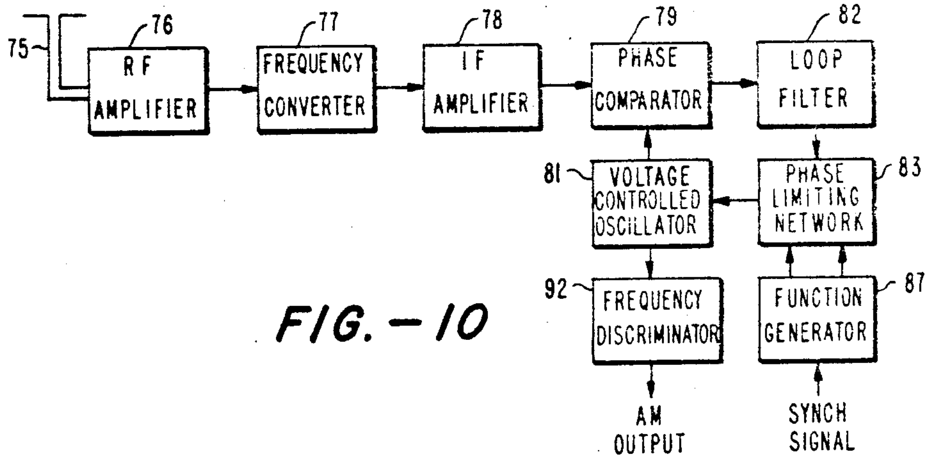
FIG. 10 is a schematic diagram of another form of phase-lock loop in accordance with the invention for receiving a substantially repetitious sequence of digitally coded information; and, FIG. 11 is an idealized waveform diagram illustrating the operation of the phase-lock loop receiver shown in FIG. 10.

Referring to the block diagram circuit of FIG. 10, there is illustrated an improved phase-lock receiver employing the phase limiting techniques in accordance with this invention for detecting non-sinusoidally coded signals, the phase of which need only be partially predictable over a repeating cycle interval. Certain specific assumptions as to the source and character of the incoming information signal are helpful in obtaining a full appreciation of this aspect of the invention, but it should be understood that these assumptions are made to represent a practical but extreme case so as to demonstrate the versatility of this invention.

Those skilled in the art will recognize that the improved phase-lock techniques of this invention are equally applicable to a wide variety of encoder and decoder devices and, in particular, those used for receiving any sort of pulse coded signals having substantially constant pulse repetition rates. This includes pulse duration modulation (PDM), pulse position modulation (PPM), pulse code modulation (PCM) in a variety of forms, or pulse amplitude modulation (PAM), all of which have substantially constant pulse repetition rates. Also, these techniques will be understood to be useful in detecting any sort of phase coherent information signal whether or not transmitted with a high frequency carrier by frequency modulation, phase modulation, or amplitude modulation. In each case, the phase limiting technique of this invention provides improved phase-locked operation that enables synchronous reception or correlation of the incoming signal with a signal estimate in the presence of high level interfering noise whenever the phase limits of the incoming information signal can be determined beforehand.

A suitable antenna 75 collects a radio frequency telemetry signal containing information sent from a remote transmitter to be applied to the input of an RF amplifier 76. The output from the RF amplifier 76 is mixed in a conventional manner with a local oscillator frequency in the frequency converter 77 to produce an intermediate signal frequency modulated in accordance with the transmitted information. This IF signal is further amplified in an IF amplifier 78 and fed to the input of a phase comparator 79 to be compared with the output signal from a voltage controlled oscillator 81. The phase error signal from the phase comparator 79 is fed back through a loop filter 82 and a phase limiting network 83 to control the frequency of the voltage controlled oscillator 81 so that it tracks the incoming signal. The loop filter 82 normally consists of a low pass filter or bandpass filter designed with a sharp cut-off at the limits of the essential information bandwidth to prevent noise disturbances with frequencies outside this bandwidth from affecting the voltage controlled oscillator 81.

Figure 11:
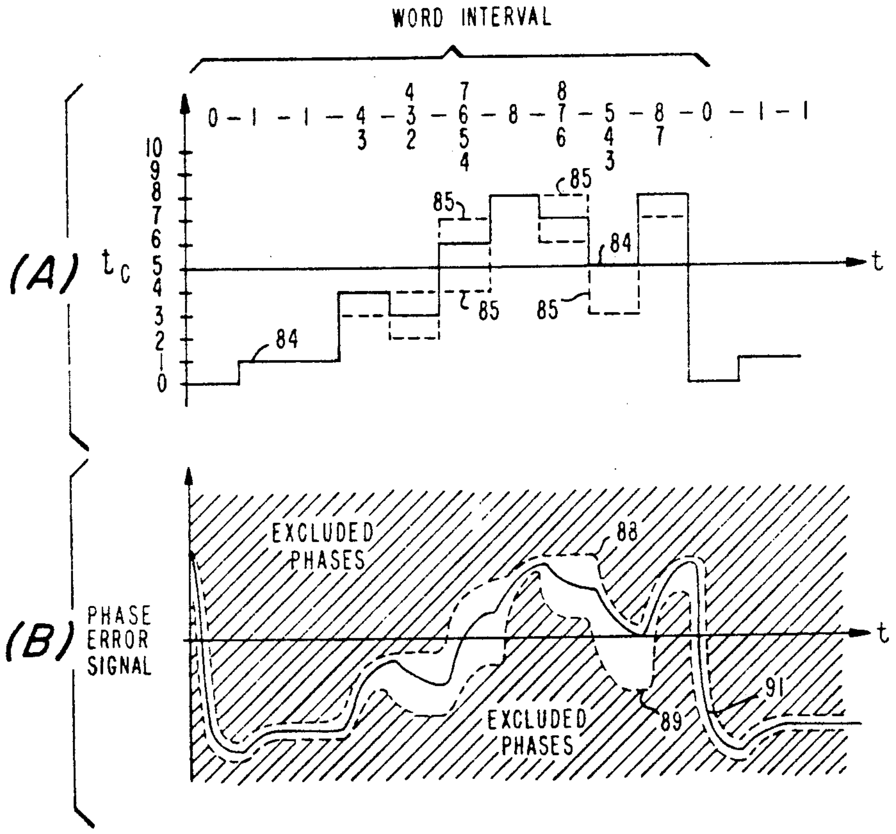

The incoming frequency modulated information signal contains a repetitive sequence of digital information occurring within a cycle interval known to begin and end within predetermined phase limits and having roughly predictable value variations throughout at least a portion of the cycle interval. For purposes of this explanation, the transmitted information is assumed to be a repetitive sequence of ten decimal digits which are combined into a single information word as shown in FIG. 11. The carrier frequency $f_c$ at the center of the bandwidth is chosen to represent the decimal digit five and the other digits are transmitted as proportional frequency deviations from the carrier frequency. Each decimal digit comprises a separate information bit with a bit interval $1/10$ the duration of the entire word interval. The first three bits 0–1–1 as well as the seventh bit 8 are the same in each repetitive sequence and can be used to identify the nature of the information contained in the other digits if this is necessary as in the case where other words may also be carried on the same channel by a multiplexing operation. In any event, the first three bits and the seventh in this example provide definite phase information during the word interval which may be used to advantage in accordance with this invention to improve the operation of a phase-lock loop.

The other digits may vary in accordance with measured variables, and may be known to vary only within certain value limits or may represent any digit within the available bandwidth. In the example of FIG. 11, each of the variable digits has been shown as having a restricted range of values indicated by the dashed lines 85 and by the numerical arrangement shown at the top of waveform A. The solid line 84 in waveform A represents the frequency characteristics of the incoming information signal for a typical series of digits within the prescribed value range and corresponds to the digits indicated by the horizontal lines of numerals separated by dashes. Alternative numerical values corresponding to the prescribed value range are shown above and below this line of numerals indicative of the solid line waveform 84.

Assume that the digital sequence represented by the solid line 84 in waveform A of FIG. 11 is being sent by means of a low powered transmitter from a spacecraft or other vehicle, and the digital values being transmitted represent certain measured conditions. Assume also that a main body of information is being sent in similar digital sequences with a high powered transmitter, but that both high powered and low powered transmissions are being timed by a single clock source. The high power transmissions when received have sufficient signal strength to permit the use of conventional FM receiving circuitry and contain sufficient data to be able to determine the distance and speed to the transmitting vehicle. By proper data processing of the high powered signal information, it will be possible to generate a synchronizing signal closely approximating the exact beginning of each word interval for the signals being received from the low powered transmitter.

The external synchronizing signal identifying the beginning of each word interval may then be used to actuate a function generator 87 that generates upper and lower amplitude limiting waveforms defining the possible phase excursion limits of the phase error signal fed back through the loop filter 82 to control the voltage controlled oscillator 81, taking into account the possible variations due to digital value changes. This is illustrated in highly idealized form in the waveform B with the upper phase limit signal being shown by the dashed line 88 and the lower phase limit signal by the dashed line 89 to correspond to the digital value variation of the information shown in wavefom A of FIG. 11. The solid line 91 in waveform B represents a phase error signal such as would result from the actual values shown by the solid waveform 84 in waveform A.

As previously explained, the loop filter 82 is designed to pass only those frequencies within the useful information bandwidth of the incoming signal. However, due to the step changes in the digital values, the phase error signal, as shown by the waveform B, may contain erratic variations having a broad frequency content in spite of the integrating action of the loop. Accordingly, in detecting digital signals, conventional frequency filters may have an extremely limited use because only very high frequency noise could be eliminated by a filter with the required wideband. Therefore, conventional phase-lock techniques possess only limited noise quieting capabilities due to the broad bandwidth of the filter required for digital operation. However, by use of the phase limiting network 83, a significant portion of the total noise can be eliminated from the feedback loop even without the use of the loop filter 82. Loop operation can further be improved by use of certain digital filters commonly employed in telemetry equipment. Also, these difficulties are less bothersome when binary codes or other fixed amplitude pulse codes are used instead of the decimally coded information sequences since only two, and at the most three, amplitude levels are encountered and the signal contains less frequency components.

It will be assumed that the synchronizing signal can be generated with sufficient accuracy to occur within a short interval $\Delta t$ on either side of the actual beginning of the word interval. Since the digital value of the first three bits is fixed, the control signal to the voltage controlled oscillator 81 can be confined within narrow limits during the first three bit intervals to give a high probability of target acquisition. Thereafter, the expanded phase limits needed to accommodate more than one digital value lower the probability of signal acquisition and increase the possibility of loss of phase-lock. But, once the loop has acquired the signal, there is a strong tendency to continue tracking in spite of noise disturbances. Then, if for some reason loss of lock occurs, a high probability for reacquisition of the signal occurs during the seventh bit interval when the digital value is again fixed. In any event, the probability of signal acquisition is increased and the possibility for the loss of phase-lock is decreased over the entire signal cycle, and the noise quieting effect is significantly improved to give lower threshold signal-to-noise ratios.

Once phase-lock occurs, then the output from the voltage controlled oscillator may be applied to a frequency discriminator 92 to yield an amplitude modulated output signal indicative of the information received from the low power transmitter, even though the presence of wideband high level noise interference reduces the signal-to-noise ratio below unity.

The phase limiting techniques of this invention are also useful in applications other than those involving phase-lock loops. For example, assume that a code generator is to be triggered by an incoming signal to generate a particular code sequence and that the incoming signal is known to occur within certain phase limits. The known phase limits can then be used to gate the triggering signal derived from the incoming signal only when its phase is within those limits. In that way, the effects of interfering noise may be minimized.

While particular arrangements have been described and illustrated herein to explain the nature of the invention, it should be understood that the invention is not limited thereto but includes any and all modifications, alterations and equivalent arrangements falling within the scope of the appended claims.

What is claimed is:

1. A circuit for deriving coded information from phase coherent incoming signals wherein the coded information occurs in a repetitious sequence within restricted phase limits comprising: a controlled variable frequency signal generator for generating a frequency estimate of the incoming signal in response to an applied control signal; means responsive to the incoming signal for generating a feedback signal indicative of the phase difference between the incoming signal and the estimate generated by said signal generator; and means for restricting the feedback signal to a set of values within a limited phase range approximating the restricted phase limits of the coded information sequences to provide said control signal, said control signal being applied to said signal generator to vary the frequency of the estimate.

2. A phase-lock circuit for deriving coded information from phase coherent incoming signals wherein the coded information occurs as a repetitious sequence within restricted phase limits comprising: a controlled variable frequency signal generator for generating a frequency estimate of the incoming signal in response to an applied control signal; means responsive to the incoming signal for generating a feedback signal indicative of the phase difference between the incoming signal and the estimate generated by said signal generator; means for restricting the feedback signal to a set of values within a limited phase range approximating the restricted phase limits of the coded information sequences to provide said control signal; and a filter means for excluding signal frequencies outside the bandwidth of the coded information sequences, said feedback signal restricting means and said filter means being connected in series between said the feedback signal, generating means and said signal generator to apply said control signal to the signal generator for adjusting the frequency estimate of the incoming signal.

3. A phase-lock loop for receiving an incoming signal having frequency variations indicative of information comprising: a voltage controlled oscillator responsive to the value of a control voltage for generating an estimate of the phase and frequency of an incoming signal; circuit means responsive to the signal estimate and the incoming signal for generating a feedback signal indicative of the phase difference between the two signals; filter means for excluding frequency components in the signal outside the bandwidth of the information contained in the incoming signal; and phase limiting means for confining the feedback signal to a selected range of time varying values corresponding to the phase limitations of the information contained in the incoming signal, said filter means and said phase limiting means being connected in series to the output of said circuit means to deliver only those feedback signals having phase characteristics within the selected range as a control voltage to adjust the frequency of the voltage controlled oscillator in a manner to track the frequency variation of the incoming signal.

4. The phase-lock loop of claim 3 wherein said phase limiting means comprises: means for generating first and second time varying phase limiting signals to define the limits of the selected range of time varying values; and first and second signal clamping means each responsive to the amplitude of a respective one of the first and second phase limiting signals and to the feedback signal to confine the control voltage applied to the voltage controlled oscillator to the selected range of time varying values defined by the phase limiting signals.

5. An improved phase-lock discriminator for detecting an incoming signal which is frequency modulated by a sinusoidal informating signal having a restricted range of phases comprising: a voltage controlled oscillator for generating an estimate of the incoming signal in accordance with the amplitude of an applied control signal; means for combining the incoming signal with the estimate of the incoming signal generated by the voltage controlled oscillator; a frequency discriminator circuit responsive to the combined signal for producing an output voltage having an amplitude proportional to the frequency deviation of the combined signal from a selected center frequency corresponding to the frequency of the carrier in the incoming signal; narrow band filtering means for passing only a narrow band of frequency components centered at the frequency of the sinusoidal information signal; and phase limiting means for generating first and second phase limiting signals having sinusoidal amplitude variations defining the limits of the restricted phase range of the sinusoidal information signal, said narrow band filtering means and said phase limiting means being connected in series to the output of the frequency discriminator circuit to restrict the amplitude of the control signal within the defined limits.

6. The improved phase-lock discriminator of claim 5 wherein said phase limiting means comprises: first and second diode clamping means for separately coupling said first and second phase limiting signals to the voltage controlled oscillator, said first and second diode clamping means being oppositely poled to prevent the control signal from exceeding the amplitude variations of the greater of the first and second phase limiting signals and for preventing said control signal from becoming less than the lesser of the first and second phase limiting signals; and means for applying said output voltage from the frequency discriminator circuit to control the frequency of the voltage controlled oscillator so long as the amplitude of the output remains intermediate the sinusoidal amplitude variations of the first and second phase limiting signals.

7. The improved phase-lock discriminator of claim 6 wherein said means for generating first and second phase limiting signals comprises: means for generating a phase reference signal indicative of a selected phase within the restricted phase range of the sinusoidal information signal; and means for algebraically adding fixed steady state amplitude increments to the sinusoidal phase reference signal to produce an amplitude difference between the first and second phase limiting signals corresponding to the limits of the restricted phase range.

8. The improved phase-lock discriminator of claim 5 wherein said phase limiting means comprises: means for generating a sinusoidal phase reference signal indicative of a selected phase within the restricted phase range of the sinusoidal information signal; and phase shifting means responsive to the sinusoidal phase reference signal to produce equal amplitude first and second phase limiting signals with a fixed phase displacement corresponding to the restricted phase range of the sinusoidal information signal.

9. The phase-lock discriminator of claim 8 further comprising: first and second clamping means being oppositely poled to prevent the control signal from exceeding an upper value and from becoming less than a lower value; and additional clamping means connected to apply the greater in amplitude of the phase shifted first and second phase limiting signals to one of said first diode clamping means as an upper value limit and to apply the lesser in amplitude of the two phase limiting signals to the second diode clamping means as a lower value limit.

10. An elector-optical tracker for locating an optical target within a field of view comprising: a rotating reticle with alternating opaque and transparent spokes extending radially from the center of rotation; optical means for focusing the field of view to form at least one image displaced from the center of rotation and confined to a fixed angular portion of the reticle; photocell means disposed adjacent the field of view image for responding to the light passing through the transparent portions of the rotating reticle, the width of said spokes varying in a coded pattern around the reticle to produce a coded output signal from the photocell means with a phase of repetition indicative of the angular position of the target image on the reticle within the field of view image; a controlled variable frequency signal generator for generating an estimate of the coded output signal from the photocell means in response to an applied control signal; means responsive to the coded output signal for generating a feedback signal indicative of the phase difference between the coded output signal and the estimate generated by the signal generator; and means for restricting the feedback signal to a set of values corresponding to the fixed angular portion of the reticle containing the field of view image and for applying the restricted feedback signal as the control signal to the signal generator for adjusting the frequency estimate of the coded output signal.

11. The electro-optical tracker of claim 10 wherein the width of said spokes vary sinusoidally from wide to narow around the reticle to produce an output signal from the photocell means which is modulated with a sinusoidal frequency variation so that the phase of the modulating sinusoid is indicative of the angular position of the target image in the field of view image; and wherein said signal generator comprises a voltage controlled oscillator for generating an estimate of the frequency of the output signal from the photocell means in accordance with the amplitude of the applied control signal.

12. The electro-optical tracker of claim 11 wherein said means responsive to the output signal from the photocell means comprises: means for combining the output signal from the photocell means with the estimate generated by the voltage controlled oscillator; and a frequency discriminator circuit responsive to the combined signal from the combining means for producing a feedback signal whose amplitude is proportional to the frequency deviations of the combined signals from a selected center frequency equal to half the total number of spokes on the reticle times the cyclical speed of rotation of the reticle.

13. The optical tracker of claim 12 further comprising: a narrow band filtering means including a bandpass filter for excluding all but a narrow band of frequency centered at the modulation frequency of the output signal from the photocell means; and wherein said feedback signal restricting means includes means for generating first and second sinusoidal phase limiting signals having sinusoidal amplitude variations at the modulation frequency of said output signal which define a range of values corresponding to the limited phase range of the output signal for optical targets within the field of view image.

14. The electro-optical tracker of claim 13 wherein said phase limiting means further comprises: first and second clamping means separately coupled to receive a respective one of said first and second sinusoidal phase limiting signals, said clamping means being oppositely poled to prevent the control signal from exceeding the amplitude variations of the greater in amplitude of the first and second sinusoidal phase limiting signals and from becoming less than the lesser in amplitude of the two sinusoidal phase limiting signals, so that the feedback signal controls the frequency of the voltage controlled oscillator so long as the feedback signal amplitude remains intermediate the amplitude variations of the first and second sinusoidal phase limiting signals.

15. The electro-optical tracker of claim 13 wherein said means for generating the first and second sinusoidal phase limiting signals comprises: means for deriving a phase reference signal indicative of a fixed angular position on the rotating reticle; and means for modifying the sinusoidal phase reference signal to represent said first and second phase limiting signals.

16. The electro-optical tracker of claim 15 wherein said phase reference signal is derived to represent a fixed angular position corresponding to a radial center line of the field of view image, and wherein said means for modifying the sinusoidal phase reference signal consists of means for algebraically adding first and second constant voltage increments of opposite polarity to produce the sinusoidal phase limiting signals of the same phase, but with an amplitude displacement corresponding to the desired phase limits.

17. The electro-optical tracker of claim 15 wherein said means for modifying the phase reference signal comprises: phase shifting means responsive to the phase reference signal for generating the first and second sinusoidal phase limiting signals having a phase displacement between them corresponding to the limited phase range.

18. A phase-lock loop for tracking an incoming signal to derive a sequence of coded information having restricted value variations throughout the sequence interval, wherein each sequence has a limited phase variation with respect to a predetermined time reference comprising: a control variable frequency signal generator for generating an estimate of the incoming signal in response to the value of an applied control signal; means responsive to the incoming signal and the estimate of the incoming signal for generating a feedback signal indicative of the difference between the coded information values of the incoming signal and the estimate generated by the function generator; and means for restricting the value of the feedback signal within a limited range of values corresponding to the restricted values and limited phase variations of the coded information sequence in the incoming signal and for applying the restricted feedback signal as a control signal to said signal generator for adjusting the frequency estimate of the incoming signal.

19. The phase-lock loop of claim 18 further including a bandpass filter for passing only those frequency components in the feedback signal which correspond to the known frequency content of the coded information sequences.

20. A phase-lock circuit for deriving a sequence of digitally coded information contained in a frequency modulated incoming signal, wherein the value of the coded information is known to vary within a restricted range throughout the sequence interval and wherein each sequence has a limited phase variation with respect to a predetermined time reference comprising: a voltage controlled oscillator for generating an estimate of the incoming signal frequency in response to the amplitude of an applied control signal; a phase comparator responsive both to the incoming signal and to the estimate of the incoming signal generated by the voltage controlled oscillator for producing a feedback signal indicative of the phase difference between the two signals; and a feedback signal limiting means for restricting the feedback signal to a set of values within a limited value range corresponding to the restricted value range of the coded information occurring with the limited phase variation and for applying this restricted feedback signal as a control signal to the voltage controlled oscillator for adjusting the estimate of the incoming signal frequency.

21. The phase-lock circuit of claim 20 further comprising: a function generator for generating first and second feedback limiting signals throughout the sequence interval synchronized with respect to the time reference, said first feedback limiting signal corresponding to a lower range of coded values and said second feedback limiting signal corresponding to an upper range of coded values occurring within the limited phase variation.

References Cited

UNITED STATES PATENTS

| | | | |
|---|---|---|---|
| 2,967,247 | 1/1961 | Turck | 250—203 |
| 3,204,185 | 8/1965 | Robinson | 329—122 X |
| 3,209,271 | 9/1965 | Smith | 329—122 |
| 3,230,379 | 1/1966 | Aroyan et al. | 250—203 |

WALTER STOLWEIN, *Primary Examiner.*

UNITED STATES PATENT OFFICE
CERTIFICATE OF CORRECTION

Patent No. 3,356,849 December 5, 1967

Theodore R. Whitney

It is hereby certified that error appears in the above numbered patent requiring correction and that the said Letters Patent should read as corrected below.

Column 1, line 42, for "a prior" read -- a priori --; column 3, line 25, for "practiced" read -- practical --; column 7, line 18, for "traget" read -- target --; line 61, for "traget" read -- target --; column 8, line 21, for "tragets" read -- targets --; line 72, for "present" read -- presence --; column 10, line 18, for "a" read -- as --; line 30, for "A cos wt +ΔA" read -- A cos wt-ΔA --; column 12, line 36, for "phse" read -- phase --; column 15, line 52, strike out "the"; column 16, line 13, for "informating" read -- information --; column 17, line 7, for "elector-optical" read -- electro-optical --.

Signed and sealed this 22nd day of April 1969.

(SEAL)
Attest:

EDWARD M.FLETCHER,JR.
Attesting Officer

EDWARD J. BRENNER
Commissioner of Patents